US008319995B2

(12) United States Patent
Nakatomi et al.

(10) Patent No.: US 8,319,995 B2
(45) Date of Patent: Nov. 27, 2012

(54) INFORMATION PROCESSING APPARATUS SELECTING OPERATION CANDIDATE FOR ELECTRONIC FILE TO BE OPERATED BY USER

(75) Inventors: Masashi Nakatomi, Kanagawa (JP); Jun-ichiro Hirayama, Kyoto (JP)

(73) Assignee: Ricoh Company, Ltd., Tokyo (JP)

( * ) Notice: Subject to any disclaimer, the term of this patent is extended or adjusted under 35 U.S.C. 154(b) by 1111 days.

(21) Appl. No.: 12/209,991

(22) Filed: Sep. 12, 2008

(65) Prior Publication Data

US 2009/0073488 A1    Mar. 19, 2009

(30) Foreign Application Priority Data

Sep. 14, 2007  (JP) .................................. 2007-239789
May 12, 2008  (JP) .................................. 2008-124588

(51) Int. Cl.
*G06F 3/12* (2006.01)
(52) U.S. Cl. ...................................... 358/1.15; 358/403
(58) Field of Classification Search .................. 358/1.1, 358/1.15, 400, 401, 402, 403, 448, 452, 468
See application file for complete search history.

(56) References Cited

U.S. PATENT DOCUMENTS 6,574,616 B1 *  6/2003  Saghir ............................ 382/305

2006/0129539 A1  6/2006  Nakatomi
2007/0050325 A1  3/2007  Nakatomi et al.

FOREIGN PATENT DOCUMENTS

| JP | 7-306847 | 11/1995 |
| JP | 10-27089 | 1/1998 |
| JP | 2007-141190 | 6/2007 |

OTHER PUBLICATIONS

Niculescu-Mizil et al., "Inductive Transfer for Bayesian Network Structure Learning" Proc. 11th International Conf. on AI and Statistics, 8 pages, 2007.
Jameson et al., "Leveraging Data About Users in General in the Learning of Individual User Models" Proceedings of the Seventeenth International Joint Conference on Artificial Intelligence, pp. 1-8, 2001.

* cited by examiner

*Primary Examiner* — Thomas D Lee
(74) *Attorney, Agent, or Firm* — Dickstein Shapiro LLP

(57) ABSTRACT

An information storing unit stores file information on an electronic file on which a user's operation is to be performed. An operation-candidate storing unit stores content information on contents of the operation. A selection-probability storing unit stores a probability value of selecting the operation. A similarity storing unit stores a similarity value of the operation between different users. A probability calculating unit calculates a function-selection-probability value for selecting an operation candidate for the electronic file, by using the file information, the content information, the probability value, and the similarity value.

18 Claims, 15 Drawing Sheets

FIG. 9

| INPUT ID \ INPUT INFORMATION | FILE EXTENSION | NUMBER OF DOCUMENT PAGES | LATEST UPDATE YEAR AND MONTH | DOCUMENT CREATOR USER ID |
|---|---|---|---|---|
| 1 | pdf | 10 | 2007.1 | A0005 |
| 2 | doc | 3 | 2006.12 | B0024 |
| 3 | txt | 1 | 2007.2 | A0013 |
| 4 | html | 2 | 2007.1 | A0003 |
| ⋮ | ⋮ | ⋮ | ⋮ | ⋮ |

FIG. 10

| OPERATION ID \ INPUT ID | 1 | 2 | 3 | 4 | 5 |
|---|---|---|---|---|---|
| 1 | 0.012 | 0.456 | 0.054 | 0.220 | 0.112 |
| 2 | 0.005 | 0.021 | 0.543 | 0.158 | 0.158 |
| 3 | 0.004 | 0.451 | 0.335 | 0.287 | 0.008 |
| 4 | 0.552 | 0.008 | 0.070 | 0.300 | 0.006 |
| ⋮ | ⋮ | ⋮ | ⋮ | ⋮ | ⋮ |

FIG. 11

| DATE AND TIME | USER ID | INPUT ID | OPERATION ID |
|---|---|---|---|
| 2007/02/09 13:02 | A001 | 1 | 1 |
| 2007/02/09 14:01 | AF4002 | 2 | 2 |
| 2007/02/09 14:12 | A0005 | 2 | 3 |
| 2007/02/09 14:13 | A0001 | 3 | 4 |
| ⋮ | ⋮ | ⋮ | ⋮ |

| USER ID \ USER ID | A0001 | A0002 | A0003 | A0004 | A0005 |
|---|---|---|---|---|---|
| A0001 | 0.312 | 0.116 | 0.114 | 0.020 | 0.192 |
| A0002 | 0.105 | 0.011 | 0.141 | 0.108 | 0.155 |
| A0003 | 0.004 | 0.351 | 0.035 | 0.287 | 0.0038 |
| A0004 | 0.502 | 0.058 | 0.170 | 0.203 | 0.015 |
| ⋮ | ⋮ | ⋮ | ⋮ | ⋮ | ⋮ |

| OPERATION ID | OPERATION DETAILS |
|---|---|
| ID #1 | A4, DUPLEX, NO COMBINATION, MONOCHROME, 1 PRINT |
| ID #2 | A4, SINGLE SIDE, 2-IN-1, FULL COLOR, 3 PRINTS |
| ID #3 | A3, SINGLE SIDE, 2-IN-1, MONOCHROME, 10 PRINTS |
| ID #4 | A4, SINGLE SIDE, NO COMBINATION, FULL COLOR, 1 PRINT |
| ⋮ | ⋮ |

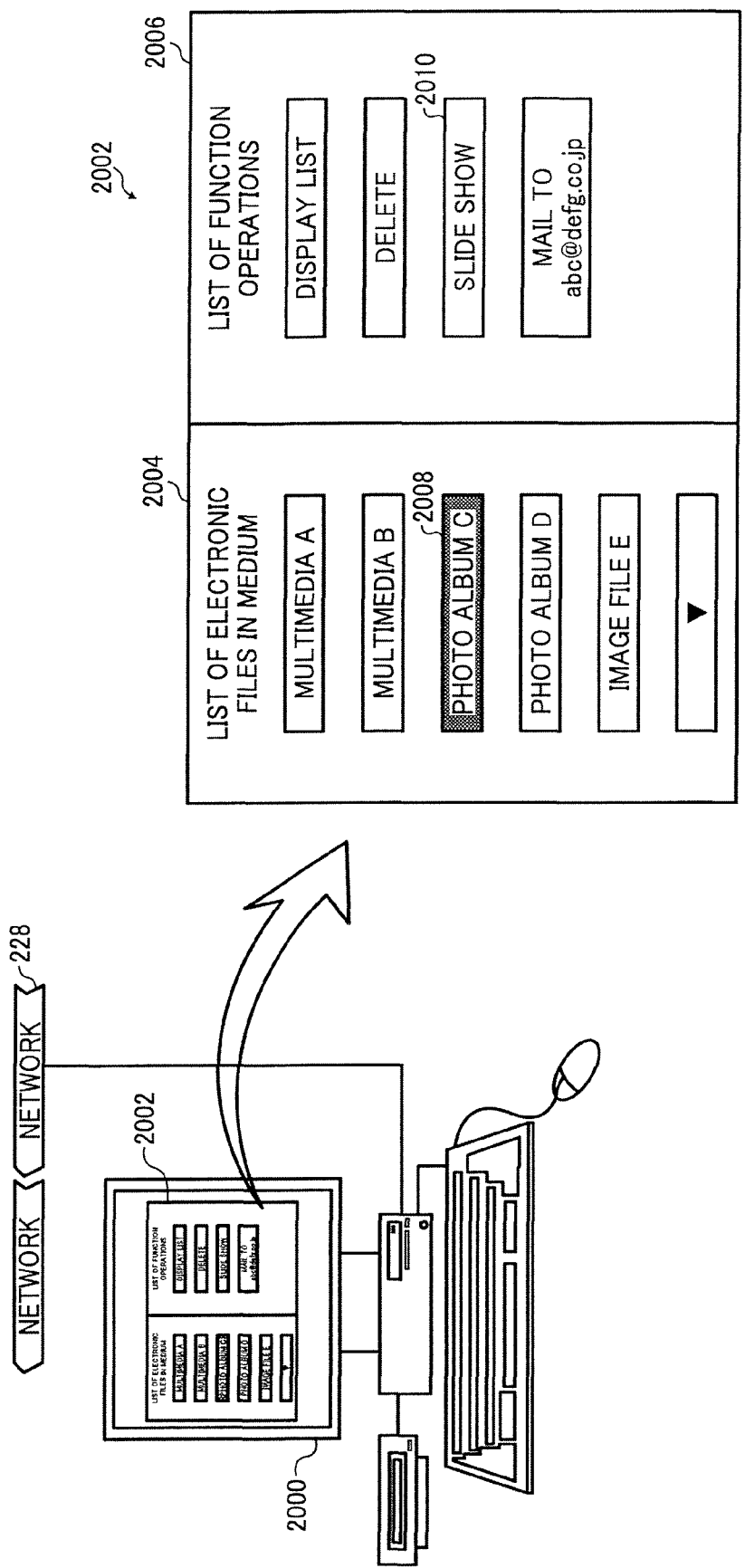

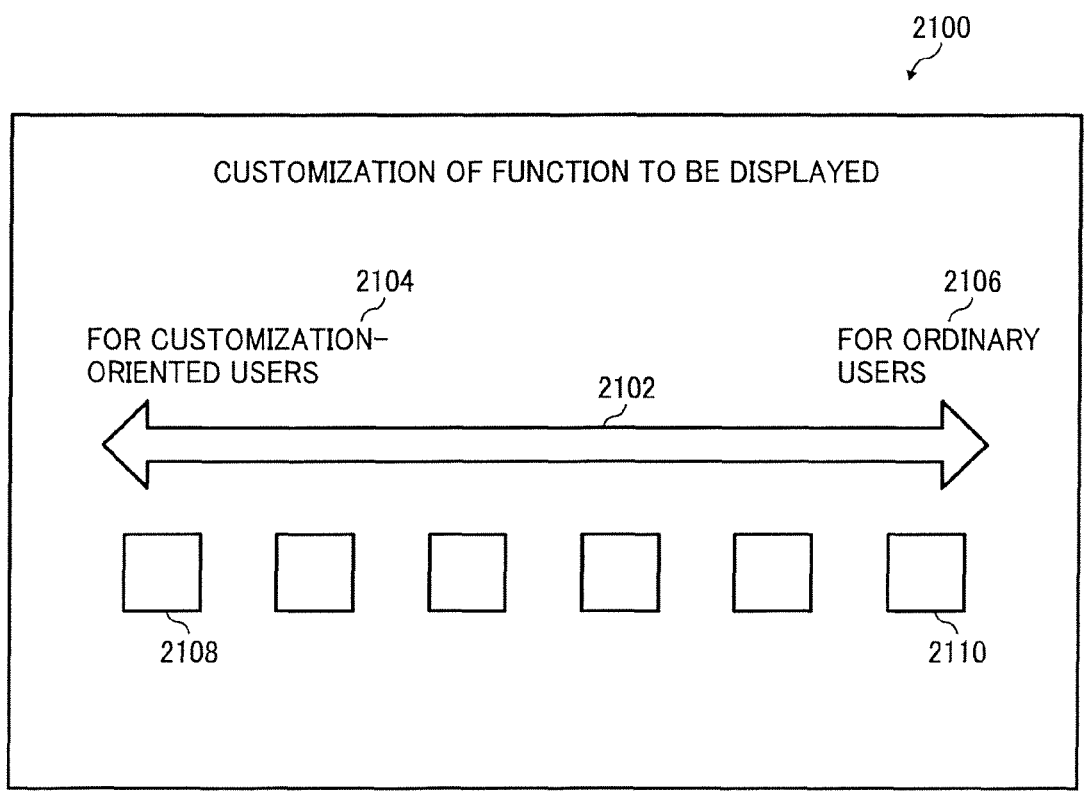

INFORMATION PROCESSING APPARATUS SELECTING OPERATION CANDIDATE FOR ELECTRONIC FILE TO BE OPERATED BY USER

CROSS-REFERENCE TO RELATED APPLICATIONS

The present application claims priority to and incorporates by reference the entire contents of Japanese priority document 2007-239789 filed in Japan on Sep. 14, 2007 and Japanese priority document 2008-124588 filed in Japan on May 12, 2008.

BACKGROUND OF THE INVENTION

1. Field of the Invention

The present invention relates to an information processing apparatus, an operation supporting method, and a computer program product for managing electronic files by using user's operation history.

2. Description of the Related Art

Various operations can be assumed to be performed onto electronic files in computers. Examples of such various operations can include those targeted for an electronic file, such as copying and moving an electronic file among recording media in the same computer or among computers, and deleting an electronic file itself. Such operations targeted for an electronic file can also include those performed on an application, such as an operation of transmitting an electronic file as being attached to an electronic mail and an operation of calling an electronic file from a specific application for printing. In addition, the operations can include those performed by an application onto an electronic file, such as editing by a document editor and compression of an electronic file for reducing the file capacity.

Furthermore, even for an operation of printing an electronic document, conditions have to be set, and various functions have to be selected or designated, such as how many prints are to be produced, whether to print on both sides of a page, and whether to print in full color or monochrome.

Although such functional diversity is preferable in terms of functional expansion, in view of having to select and set many functions and conditions, a user is forced to perform more bothersome operations. For example, even simply selecting duplex printing requires many clicking operations, such as opening a print wizard, clicking a print setting button to cause a setting wizard to be displayed, clicking duplex printing, and then ending the setting wizard. Moreover, the user is required to physically move a pointer device, such as a mouse, for clicking each button. Such bothersome selecting operation may become a barrier to effective usage of the functions.

A method of predicting and presenting functions with a high possibility of being selected by the user has been suggested. For example, Japanese Patent Application Laid-Open No. H10-027089 discloses an operation supporting apparatus including a command history storage unit and a command predicting unit that selects the latest command from out of commands satisfying a predetermined condition as a predicted command. Also, Japanese Patent Application Laid-Open No. H07-306847 discloses a computer operation supporting apparatus that records history of commands launched into a computer system in time series and selects the latest command from out of commands satisfying a predetermined condition as a predicted command. In the patent documents, a method of predicting a user's operation based on previous print history of that user is adopted. Furthermore, for prediction for a specific user or user group, a technique of configuring a user model representing knowledge of that user or user group and performing estimation based on that model is used, which is utilized for operation supporting.

The conventional technique has a problem, however, such that if previous history is not sufficiently accumulated, an accurate model cannot be configured. To get around this problem, a collaborative method of combing information about a plurality of users is often used together. One useful method as this collaborative method is collaborative filtering, which is a technique, for example, in Internet shopping, where a combination of evaluations of products by a plurality of users is obtained as history, thereby predicting an evaluation of a product whose evaluation value has not yet been obtained for a user.

Collaborative filtering is a technique assuming that there is a correlation among evaluations, and when applied to function prediction, a function selection is predicted only from the correlation among the evaluations for each function. However, which function the user will use can depend to a large degree on the electronic file for which the function is to be selected. That is, with information about a target for which the function is to be performed (for example, information about a creator, details, and file name of the electronic file) being taken as input variables and with functions (for example, details of operations to be performed onto the electronic file) being taken as output variables, selection of a function to be performed onto an electronic file on a personal computer depends to a large degree on that target electronic file. As such, for function prediction, a relation between the output variable and the input variables is important. Also, when a plurality of functions are combined for use, such as "combination printing" and "10 prints" in file printing, a dependency between these functions is also important. Such complex dependency between the variables, in particular, the input variables and the output variables and between the output variables, cannot be handled by collaborative filtering.

One method capable of handling such complex dependency between the input and output variables is a Bayesian network. By using this method, such complex dependency can be modelized under an appropriate constraint without discriminating between inputs and outputs. With this, a function, that is, a user's intention, can be predicted with higher accuracy. This method, however, includes few collaborative methods, and these methods cannot be easily applied to function prediction in the present invention. For example, A. Jameson and F. Wittig, "Leveraging data about users in general in the learning of individual user model", In B. Nebel, editor, Proceedings of the Seventeenth International Joint Conference on Artificial Intelligence, pages 1185-1192, San Francisco, Calif., 2001, Morgan Kaufman, discloses several methods for how to combine an individual model and a general model. Also, A. Niculescu-Mizil and R. Caruana, "Inductive transfer for Bayesian network structure learning", In Proc. 11th International Conf. on AI and Statistics, 2007, discloses a method of simultaneously finding a plurality of models with a similar structure, but merely discloses finding a model structure, and the combination technique lacks logical adequacy. Therefore, applicability other than the case applied in the document is not clear, and the method cannot be directly applied to a user-model configuring method usable for general intension estimation of operations of an image forming apparatus.

SUMMARY OF THE INVENTION

It is an object of the present invention to at least partially solve the problems in the conventional technology.

According to an aspect of the present invention, there is provided an information processing apparatus that predicts a user's operation on an electronic file. The information processing apparatus includes an information obtaining unit that obtains file information on the electronic file; an information storing unit that stores therein the file information; an operation-candidate storing unit that stores therein content information on contents of the operation; a selection-probability storing unit that stores therein a probability value of selecting the operation provided for each user; a similarity storing unit that stores therein a similarity value of the operation between different users; and a probability calculating unit that calculates a function-selection-probability value for selecting an operation candidate for the electronic file to be operated by the user, by using the file information, the content information, the probability value, and the similarity value.

Furthermore, according to another aspect of the present invention, there is provided an operation supporting method of predicting a user's operation on an electronic file. The operation supporting method includes obtaining file information on the electronic file; storing the file information; storing content information on contents of the operation; a probability value of selecting the operation provided for each user; storing a similarity value of the operation between different users; and calculating a function-selection-probability value for selecting an operation candidate for the electronic file to be operated by the user, by using the file information, the content information, the probability value, and the similarity value.

Moreover, according to still another aspect of the present invention, there is provided a computer program product including a computer-usable medium having computer-readable program codes embodied in the medium for predicting a user's operation on an electronic file. The program codes when executed cause a computer to execute obtaining file information on the electronic file; storing the file information; storing content information on contents of the operation; storing a probability value of selecting the operation provided for each user; storing a similarity value of the operation between different users; and calculating a function-selection-probability value for selecting an operation candidate for the electronic file to be operated by the user, by using the file information, the content information, the probability value, and the similarity value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a drawing of an embodiment of an input information table;

FIG. 10 is a drawing of an embodiment of a selection probability table;

FIG. 11 is a drawing of an embodiment of an operation history table;

FIG. 18 is a drawing of another embodiment in which a program for performing an operation supporting process is implemented as a printer driver of a client machine 106a;

FIG. 19 is a drawing of a data table in which operation history is registered by the printer driver;

FIG. 20 is a drawing of an embodiment when the information processing apparatus according to an embodiment applies an operation support to an electronic file stored in a medium registered in a DVD, CD-ROM, or MO drive, for example; and FIG. 21 is a drawing of an embodiment of an adjust screen with a versatility index α of the embodiment.

DETAILED DESCRIPTION OF THE PREFERRED EMBODIMENTS

Figure 1:
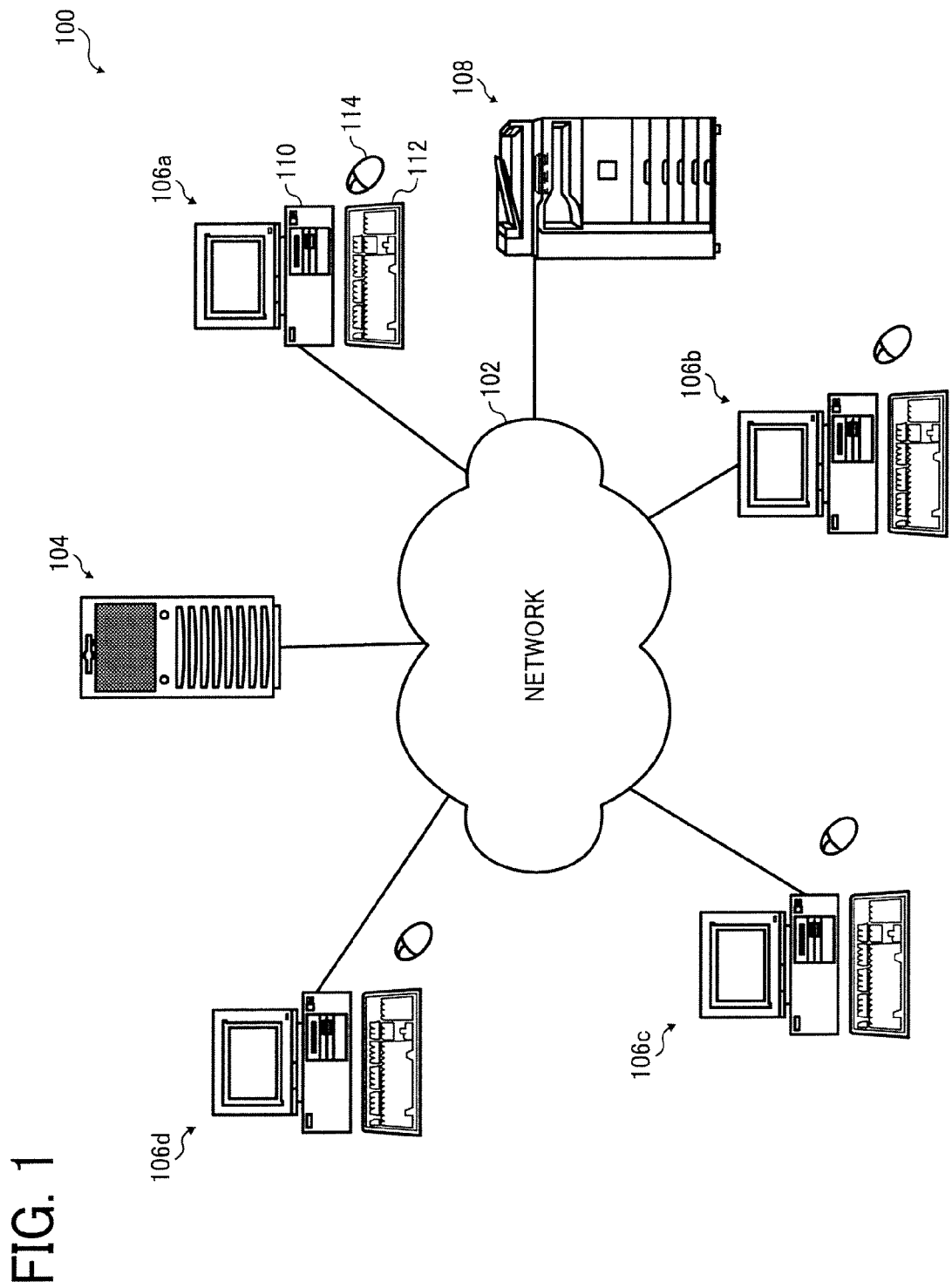
FIG. 1 is a drawing of an operation supporting system according to an embodiment.

Exemplary embodiments of the present invention are explained in detail below with reference to the accompanying drawings. The present invention, however, is not limited to the embodiments. FIG. 1 depicts an operation supporting system 100 according to an embodiment. The operation supporting system 100 depicted in FIG. 1 includes a network 102, client machines 106a, 106b, 106c, and 106d connected to the network 102, and a multifunction peripheral (MFP) 108 also functioning as a network printer. Furthermore, the network 102 is connected thereto a management server 104 that manages information about electronic files, providing information about operations onto the electronic files to the client machines 106a to 106d.

The network 102 includes the Internet, a wide-area network (WAN), or a local-area network (LAN), sending requests from the client machines 106a to 106d to the management server 104 and causing the client machines 106a to 106d to obtain responses from the management server.

The client machines 106a to 106d and the management server 104 each include an information processing apparatus, such as a personal computer, a workstation, an MFP, and a server, including a computer 110, a keyboard 112, and a mouse 114. Also, the management server 104 performs a process with an operating system, such as Windows™ 200X, Unix™, or Linux™. The management server 104 selects an operation command based on operation history of an electronic file and providing the command to the client machines 106a to 106d.

Figure 2:
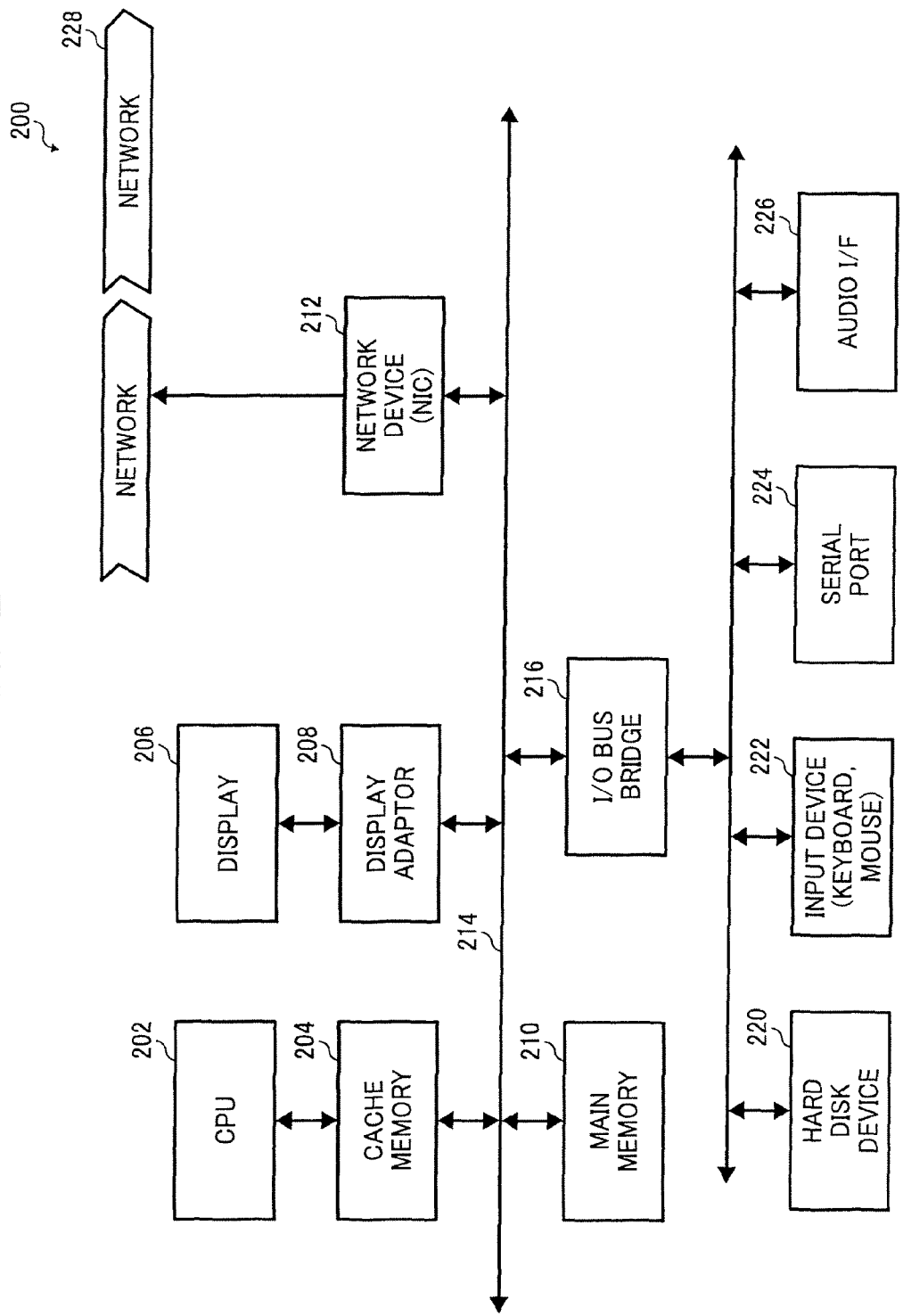
FIG. 2 is a drawing of a functional configuration of an information processing apparatus for use in the embodiment.

FIG. 2 depicts a functional configuration of an information processing apparatus 200 for use in the present embodiment. As explained above, the information processing apparatus 200 can be configured as a personal computer, a workstation, a multifunctional copier, or a server, for example. Here, the personal computer, the server, and the multifunctional copier can adopt a similar basic configuration as a hardware configuration although different software configurations are taken due to the operating system (OS) for use and a boot process. For example, if the client machines 106a to 106d are personal computers, they can use Windows™ XP or the like as an OS. Also, when the information processing apparatus 200 is a server or a workstation, Windows™ 200X Server, Unix™, or Linux™ can be used as appropriate.

The information processing apparatus 200 includes a central processing unit (CPU) 202, a cache memory 204 allowing high-speed access to data for use by the CPU 202, and a main memory 210 formed of a solid memory element, such as a random access memory (RAM) or a dynamic RAM (DRAM), allowing processing of the CPU 202, shown in FIG. 2. The CPU 202, the cache memory 204, and the main memory 210 are connected via a system bus 214 to other devices or drivers of the information processing apparatus 200, such as a display adaptor 208 and a network device (NIC) 212. The display adaptor 208 is connected via a bus to a display 206 to cause the process results by the CPU 202 to be displayed on a display screen. The network device 212 connects the information processing apparatus 200 to a network 228 at a transport-layer level and a physical-layer level to allow transactions with the client machines 106a to 106d.

The system bus 214 has further connected thereto an input/output (I/O) bus bridge 216. On a downstream side of the I/O bus bridge 216, a hard disk device 220 is connected via an I/O bus 218. To the I/O bus 218, an input device 222, such as a keyboard, a mouse, and the like, is connected via a bus, such as a universal serial bus (USB), accepting inputs and instructions from an operator, such as a system administrator. The information processing apparatus 200 is also connected via the I/O bus 218 from a serial port 224 to a printer, such as the MFP 108, making instructions for performing a process, such as printing, facsimile, or scanning. The information processing apparatus 200 further includes an audio interface (I/F) 226, allowing command inputs from a voice processing system (not shown) via the I/O bus 218.

Figure 3:
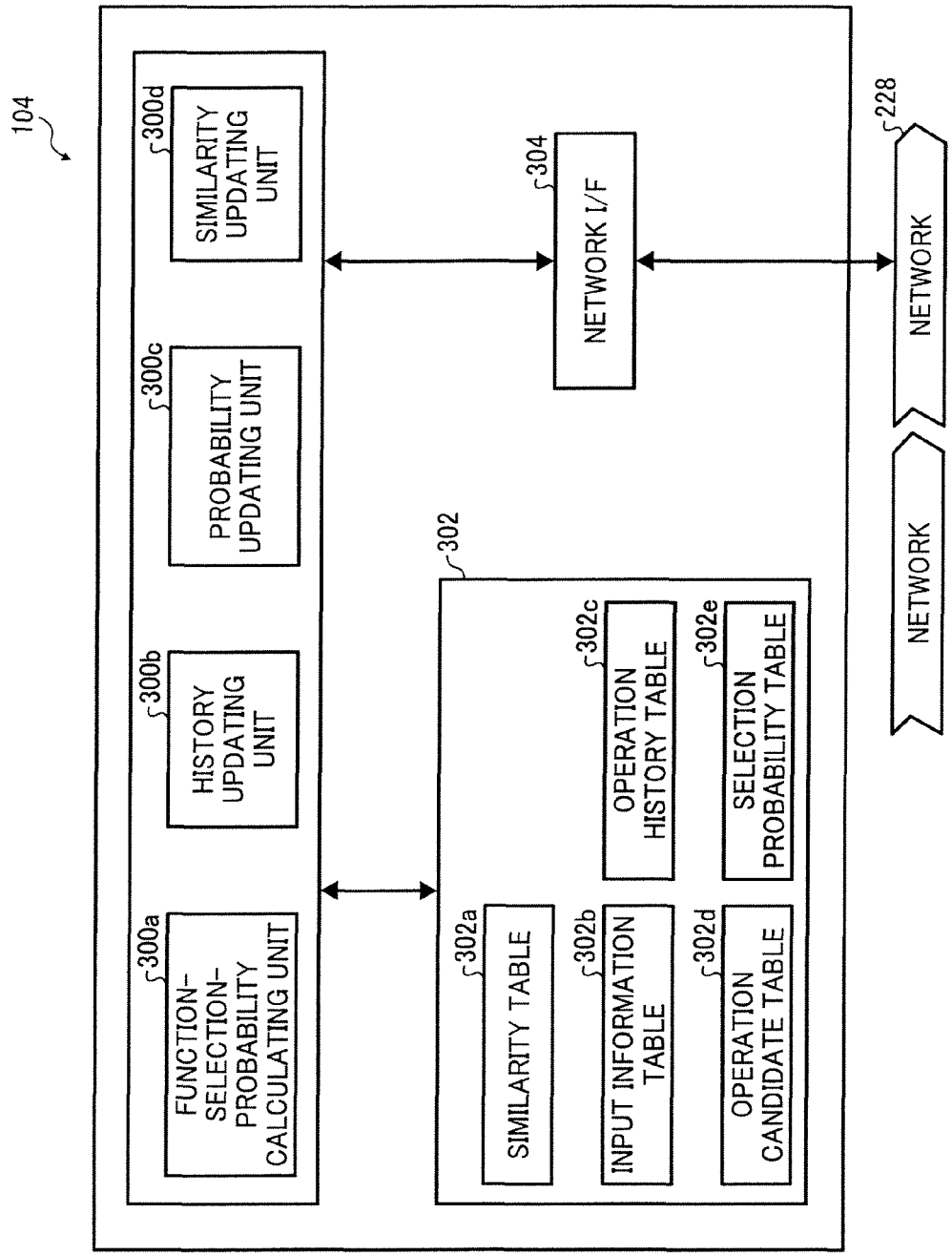
FIG. 3 is a drawing of a functional configuration of a management server.

FIG. 3 depicts a functional configuration of the management server 104. The management server 104 includes a history managing unit 300, a table set 302, which is a data set providing data of the client machines 106a to 106d to the history managing unit 300 to allow history management, and a network I/F 304 for interconnecting the client machines 106a to 106d via the network 228.

The history managing unit 300 includes a function-selection-probability calculating unit 300a, a history updating unit 300b, a probability updating unit 300c, and a similarity updating unit 300d. The function-selection-probability calculating unit 300a reads information stored in a storage device, such as the hard disk device 220, and calculates the magnitude of a possibility of the user providing an operation command to a predetermined electronic file and the user providing the operation command to another operation command at each of the client machines 106a to 106d. Also, in a second embodiment, the function-selection-probability calculating unit 300a can include a selection-probability changing unit (not shown) that changes a selection probability of a function to be selected by using a versatility index α. The selection probability changing unit can be implemented as a program module that obtains the versatility index α registered in a memory or the like depending on whether the function to be selected has versatility and, by using the value of the versatility index α, corrects a function selection probability. In function selection, the selection probability changing unit changes a selection probability of a function to be presented according to the user or user group, allowing user customization.

The history updating unit 300b updates an operation history table 302c registered in the table set 302 with information transmitted from a client machine via the network I/F 304 functioning as an information obtaining unit. The probability updating unit 300c updates a selection probability table 302e by using the details of the operation history table 302c and an input information table 302b. The similarity updating unit 300d updates a similarity table 302a based on the details of the operation history table 302c and the selection probability table 302e.

The table set 302 stored in a storage device, such as the hard disk device 220, includes the similarity table 302a, the input information table 302b, the operation history table 302c, an operation candidate table 302d, and the selection probability table 302e. The operation candidate table 302d retains detail information, such as operations performed at the client machines, the paper size and the number of prints at the time of each operation, and data when an operation such as a combining process is performed. The similarity table 302a retains similarity of operation tendency among users in numerical form.

The input information table 302b retains information about electronic files operated at the client machines. The operation history table 302c retains each operation previously performed by the users, with the information about the electronic file, information about the operation, and time information at the time of performing the operation being associated with each other. The selection probability table 302e retains, for each user, a degree of possibility of selecting a certain operation for a certain input. These tables in the table set 302 are updated by the history updating unit 300b, the probability updating unit 300c, the similarity updating unit 300d, and others, according to the history of the operation commands provided by the users from the client machines 106a to 106d onto a predetermined electronic file.

Figure 4:
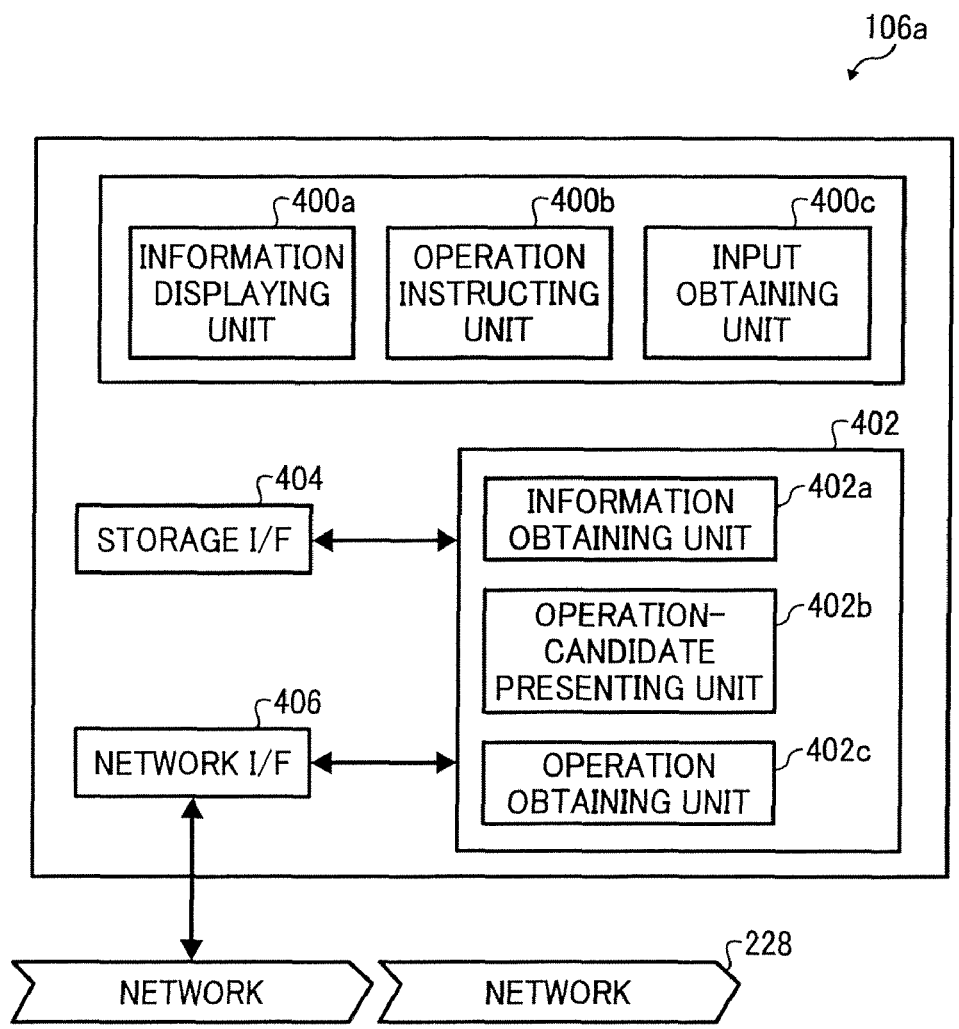
FIG. 4 is a drawing of an example of a functional configuration of a client machine.

FIG. 4 exemplifies a functional configuration of the client machine 106a from among the client machines 106a to 106d. A configuration similar to this can be used for the client machines 106b to 106d. The client machine 106a includes a user I/F unit 400, an operation-supporting-information processing unit 402, a storage I/F 404, and a network I/F 406.

The user I/F unit 400 includes an information displaying unit 400a, an operation instructing unit 400b, and an input obtaining unit 400c. The information displaying unit 400a performs a process of presenting information to the user via a display screen. The operation instructing unit 400b includes an event handler, for example, providing an interface for inputting via a pointing device or a keyboard an electronic-file identification value, such as a file name designated by the user, an operation command, and information required for the operation command. Furthermore, the input obtaining unit 400c decodes the operation command from the input from the operation instructing unit 400b to obtain information.

The operation-supporting-information processing unit 402 includes an information obtaining unit 402a that obtains information from the input obtaining unit 400c, such as an electronic-file identification value selected by the user, an operation-candidate presenting unit 402b that presents function candidates for selection obtained from the management server 104 as operation supporting information, and an operation obtaining unit 402c that obtains details of the operation command actually performed by the user. These various pieces of information obtained by the operation-supporting-information processing unit 402 are stored in a memory, the hard disk device, a USB memory, or the like via the storage I/F 404. The information obtained by the operation-supporting-information processing unit 402 is sent via the network I/F 406 to the network 228 to be reflected on a process by the management server 104 using history information.

Figure 5:
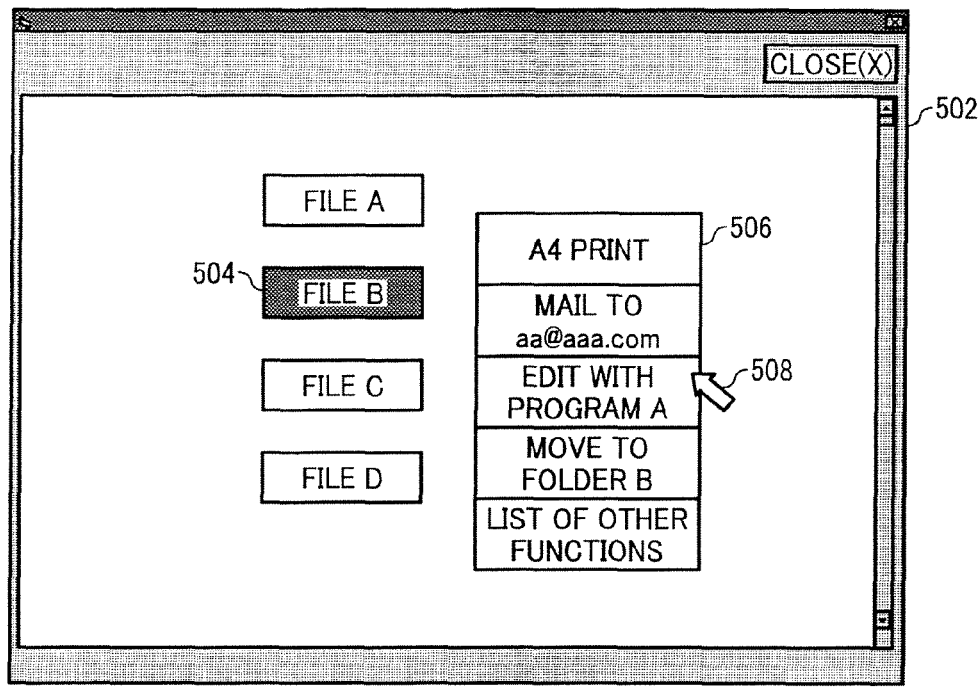
FIG. 5 is a drawing of an embodiment of a function selection screen to be displayed by the client machine on its display screen.

FIG. 5 depicts an embodiment of a function selection screen 500 to be displayed by the client machine 106a on its display screen. The function selection screen 500 shown in FIG. 5 causes an electronic-file identification value, such as a file name, to be displayed on a display screen as an icon 504. As the displayed electronic-file identification value, for example, a file name of an electronic file registered on a default folder in the hard disk device 220 or a medium, such as a digital versatile disk (DVD) or a compact disk-read only memory (CD-ROM), is used.

With a mouse pointer or the like being positioned on an icon representing an electronic file, the user performs an operation of, for example, pressing a button on a mouse. In the present embodiment, a pressing operation by the user activates an operation supporting process, thereby assisting the user performing an operation onto the designated electronic file. The operation supporting process includes sending the designated electronic-file identification value to the management server 104, which then refers to the managed operation history of other users to predict operations recommended with a high probability for the electronic file.

The prediction results of the management server 104 are configured as menu items in a pop-up menu 506, as depicted in FIG. 5. The user matches a mouse pointer 508 with a desired operation menu item and then presses a mouse, thereby selecting and performing a target operation.

Timings when the management server 104 performs operation prediction include the following timings in addition to those explained above:

(1) when an icon representing an electronic file is dragged and dropped onto a specific icon representing the operation supporting system;

(2) when an icon of an electronic file displayed on the display screen is selected by a hardware button on the keyboard and, in that state, a hardware button or a button set assigned with a command for presenting operation candidates is pressed; and (3) while an electronic file is being used with a predetermined application, when a hardware button representing activation of the operation supporting system 100 is pressed, or when activation of the operation supporting system 100 is selected through an icon, a menu bar, or the like by the pointing device on the display screen.

The cases (1) to (3) can be selected singly or in combination as appropriate according to user's operability and the user I/F of the information processing apparatus 200 in use.

Figure 6:
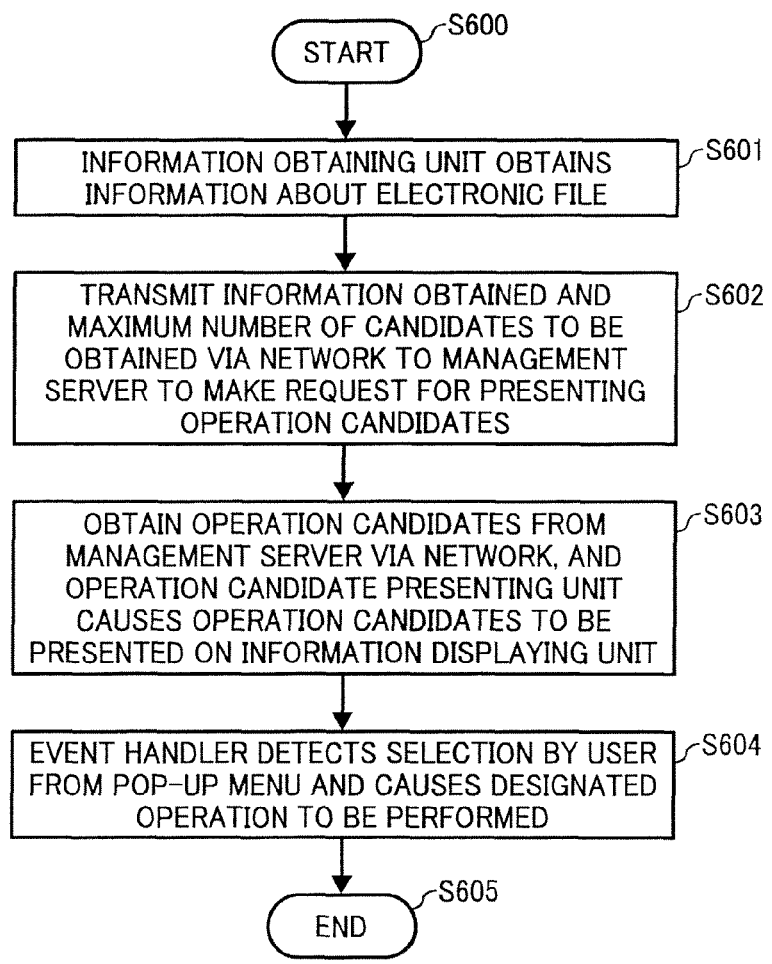
FIG. 6 is a flowchart of an embodiment of an operation supporting process by the management server performed on the client machine.

FIG. 6 is a flowchart of an embodiment of an operation supporting process by the management server 104 performed on the client machine 106a. An operation supporting request process starts from Step S600. At Step S601, the information obtaining unit 402a obtains information about a selected electronic file. The information about the electronic file includes an electronic-file identification value that uniquely identifies the electronic file, an extension of the electronic file, a total number of pages if the electronic file can include a page identification, the latest update year and month, and a user ID of a user creating the electronic file.

In Step S602, the obtained information and the maximum number of operation candidates to be obtained are transmitted via the network to the management server 104, making a request for selecting and presenting the operation candidates.

In Step S603, operation candidates corresponding to the operation support request are obtained from the management server 104, the operation-candidate presenting unit 402b sets the operation candidates as a menu item of the pop-up menu 506 and causes the operation candidates to be displayed on the information displaying unit 400a. In Step S604, the event handler detects selection by the user of a menu item displayed in the pop-up menu 506, causes the designated operation to be performed, and then ends the procedure at Step S605

Figures 7, 8:
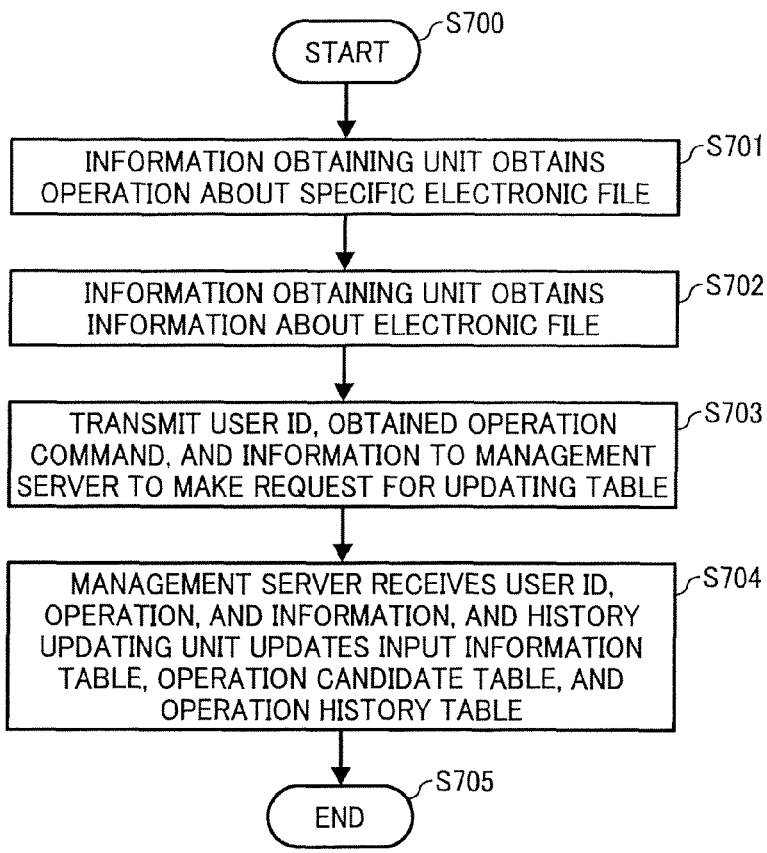
FIG. 7 is a flowchart of an embodiment of a process of the client machine updating a table set managed by the management server.
FIG. 8 is a drawing of an embodiment of an operation candidate table.

FIG. 7 is a flowchart of an embodiment of a process of the client machine updating the table set 302 managed by the management server 104. Here, in the process shown in FIG. 7, registration can be made as an independent icon or menu bar. Also, in another embodiment, the process can be configured as an object or method called after a specific operation is performed onto an electronic file. The history updating process starts from Step S700. At Step S701, an operation for a predetermined electronic file is obtained. At Step S702, the information obtaining unit 402a obtains information about the specific electronic file. At Step S703, the information obtaining unit 402a transmits the user ID of the user performing the operation, the obtained operation command, and information, such as the electronic-file identification value, to the management server 104, making a request for updating the table set.

At Step S704, the management server 104 receives the user ID, the operation command, and the information, and the history updating unit updates the input information table 302b, the operation candidate table 302d, and the operation history table 302c. The procedure then ends at Step S705.

With reference to FIGS. 8 to 12, embodiments of the table set 302 managed by the management server 104 are explained below. FIG. 8 is an embodiment of the operation candidate table 302d. The operation candidate table 302d includes, as records, a field 800 in which an operation ID for uniquely identify an operation command is registered and a field 802 in which the operation details of the operation command are registered with the operation command and setting information being associated with each other. Upon receiving a history update request from the client machine 106a, for example, the management server 104 searches the operation candidate table 302d to determine whether the received operation command and operation details are registered. If the operation command and operation details are registered, the operation candidate table 302d is not updated, and the procedure is caused to be branched to another process. On the other hand, if the received operation command and operation details is not registered in the operation candidate table 302d, a new operation ID is obtained, the new operation ID is added to the field 800, and then the operation details are added to the field 802, thereby registering a new record.

FIG. 9 is an embodiment of the input information table 302b. Upon receiving information about the electronic file from the client machine 106a, for example, the management server 104 searches the managed information about electronic files to determine whether the information about the same file is registered. As a result of this search, if the same file is registered, the process of updating the input information table 302b is terminated. On the other hand, if the electronic-file identification value is the same and the file extension and the user ID match the managed ones, the value of the record with the input ID corresponding to the matching electronic-file identification value is updated. Furthermore, if the same electronic-file identification value is not registered, the management server 104 obtains a new input ID, and writes the received information about the electronic file in the corresponding field of a record defined by the new input ID for addition as a new record.

The input information table 302b is registered therein fields 900, 902, 904, 906, and 908 corresponding to the input information, the fields for registering input information indicating the type of the input information with respect to the input ID. Each element value forms a record for each input ID. As the input information, the file extension, the number of pages, the latest update year and month, and a creator user ID are set, for example, and each can be taken as an element value. The input information is not restricted to these, however, and the input information can be set as appropriate according to a specific use purpose. Here, as the file extension, pdf, doc, txt, and html can be used. In the embodiment depicted in FIG. 9, the number of pages, the latest update year and month, and the creator user ID are registered as the input information providing element values. These element values can be used as, for example, identification information that identifies a different electronic file with the same electronic-file identification value.

FIG. 10 is a drawing of an embodiment of the selection probability table 302e. The selection probability table 302e is created for each user, and therefore there are as many selection probability tables 302e as the number of users. A row 1000 in the selection probability table 302e represents the input IDs corresponding to those in the row of the operation candidate table 302d, whilst a column 1002 in the selection probability table 302e refers to the operation IDs corresponding to those in the row of the input information table 302b. Registered in an i-th row and a j-th column of the selection probability table 302e shown in FIG. 10 is a probability value of selecting an operation specified with an operation ID=Y(i) when a file with an input ID=X(j) is selected. Here, the probability value is calculated by obtaining a causal relation of the input information selected for a specific operation from the history of the user associated with the table and using a Bayesian network. Such a process of calculating a probability value by using a Bayesian network will be explained in detail further below.

FIG. 11 is a drawing of an embodiment of the operation history table 302c. The operation history table 302c includes a field 1100 in which a timestamp indicative of a time when an operation was performed onto the electronic file is registered, a field 1102 in which a user ID of the user performing the operation is registered, a field 1104 in which an input ID indicative of input history is registered, and an operation ID 1106, forming a record identified by the timestamp. When a new operation input is provided from the user, the element value in each field of the operation history table 302c is updated by the history updating unit 300b.

Figures 12, 13:
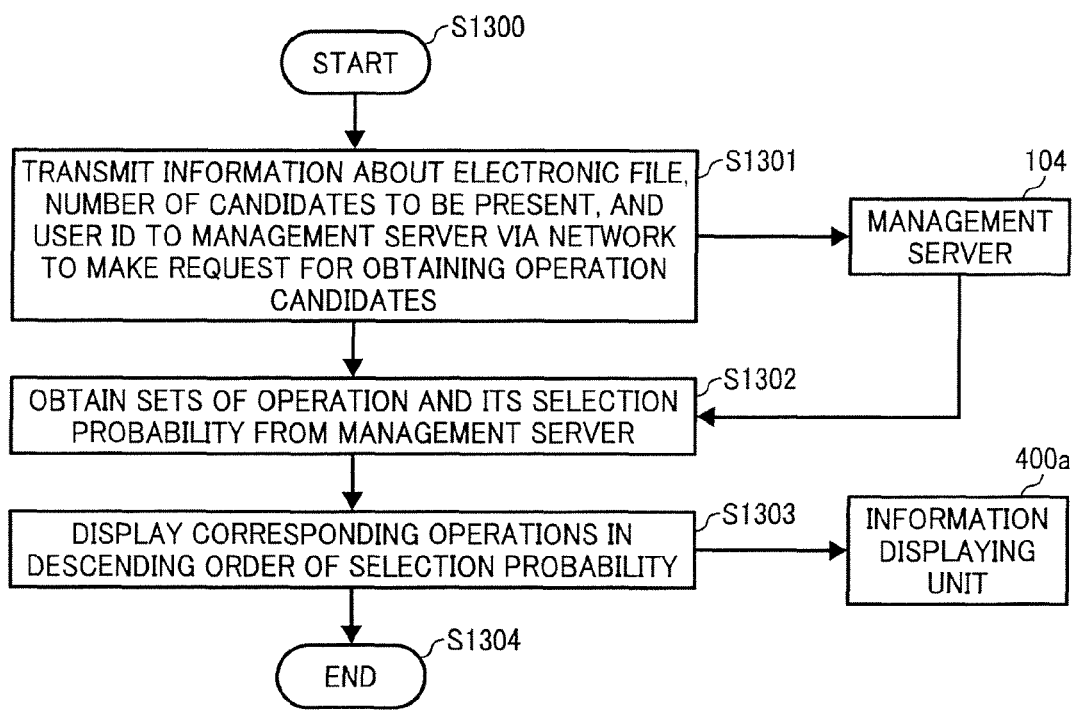
FIG. 12 is a drawing of an embodiment of a similarity table.
FIG. 13 is a flowchart of an embodiment of a process of a selection-candidate presenting unit included in the client machine.

FIG. 12 is a drawing of an embodiment of the similarity table 302a. The similarity table 302a is used to include operations performed by different users in supporting information, and represents similarity of another user when viewed from a specific user. Element values entered in the similarity table 302a are given by selecting, from the selection probability table 302e shown in FIG. 10, probability values specified by the input IDs and the operation IDs registered for the same user ID in the operation history table 302c, and multiplying all of the selection probabilities corresponding to the input IDs and the operation IDs registered for the user ID. Therefore, by using the similarity table 302a, the operations designated by other users can be presented as operation supporting information. Upon update of the operation history table 302c, the similarity table 302a is updated as being linked with the update, with the function of a relational database or the like. Here, in the present embodiment, the similarity is also calculated for the same user in a similar manner. Therefore, even if the amount of operation history registered for the same user is small, in addition to the operation history of the same user, the operations performed by other users can be used for input support, with these similarity values as criteria.

FIG. 13 is a flowchart of an embodiment of a process of the selection-candidate presenting unit 402b included in the client machine 106a. The process of the operation-candidate presenting unit 402b starts at Step S1300 by the user inputting an operation code and information for the operation. At Step S1301, the operation-candidate presenting unit 402b transmits, via the network to the management server 104, information about the electronic file, the number of candidates to be presented, and the user ID, making a request for obtaining operation candidates.

At Step S1302, sets of an operation candidate and its selection probability are obtained from the management server 104. At Step S1303, the operation candidates are sorted in descending order from a selection candidate with the highest selection probability to a selection candidate with the lowest selection probability, are registered in a menu item document, and are presented to the user via the information displaying unit 400a by activating a PopupMenu class, for example, thereby ending the process. Here, the information displaying unit 400a uses the event handler or the like to monitor a menu selection event of the user using the mouse 114 or the like and, in response to a menu selection event of the user, passes an operation command for performing a selection candidate and process information to the input obtaining unit 400c to cause the selected selection candidate operation to be performed.

Figure 14:
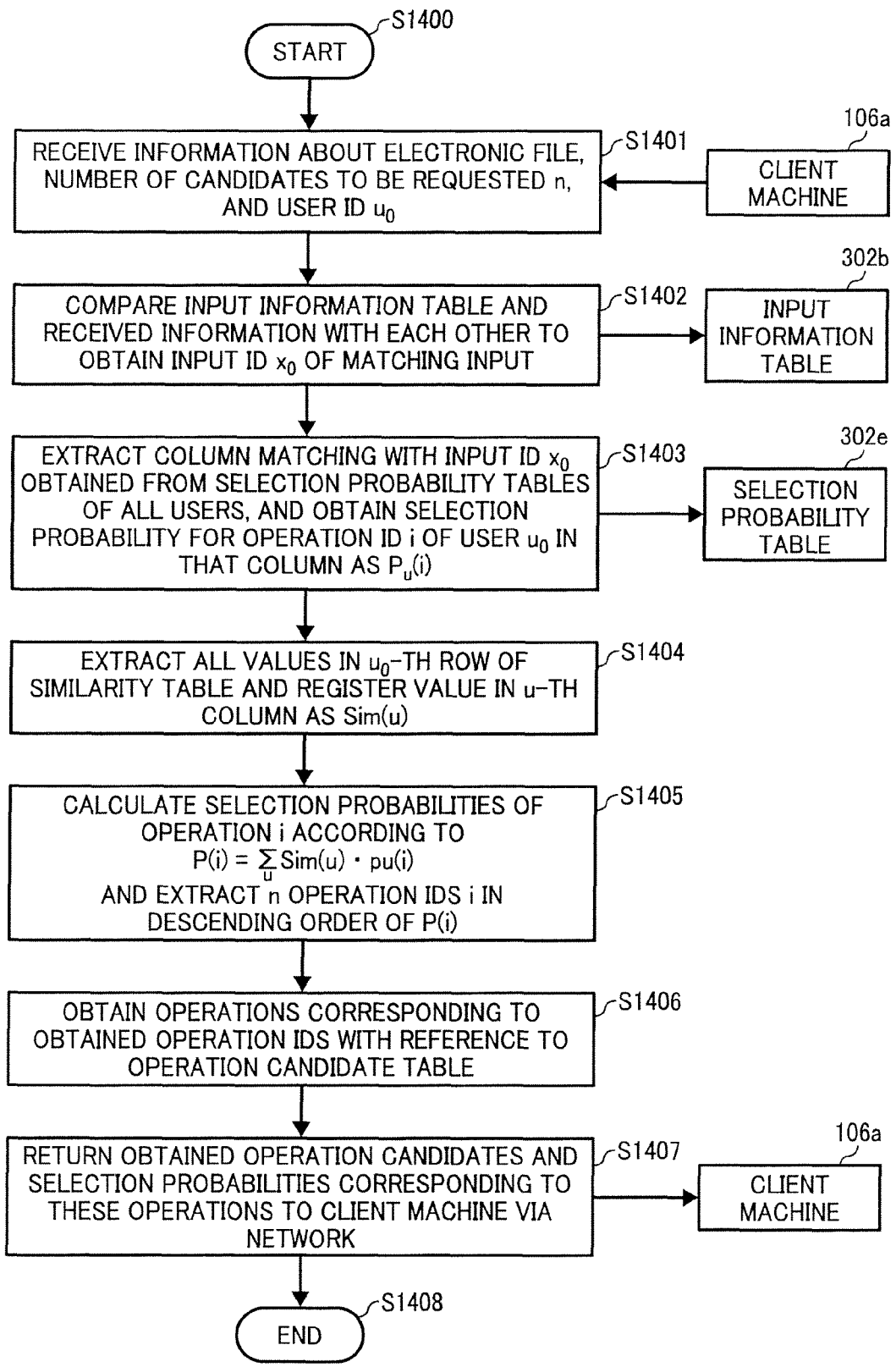
FIG. 14 is a flowchart of an embodiment of a selection probability calculation performed by a function-selection-probability calculating unit of the management server.

FIG. 14 is a flowchart of an embodiment of a selection probability calculation performed by the function-selection-probability calculating unit 300a of the management server 104. The process shown in FIG. 14 starts from Step S1400. At Step S1401, information about the electronic file, the number of selection candidates to be requested n, and the user ID=$u_0$ are received from the client machine 106a. At Step S1402, the input information table 302b and the received information are compared with each other, and the input ID=$x_0$ of the matching input is obtained and registered in the input information table 302b.

At Step S1403, the selection probability tables 302e of all users are searched for a column matching the input ID=x0. In that extracted column, the selection probability for the operation $ID_i$ of the user $u_0$ is obtained and registered in a memory as Pu(i). At Step S1404, by referring to the similarity table 302a, all values in an $u_0$-th row of the similarity table 302a are extracted, and the value in a u-th column is registered in the memory as Sim(u). At Step S1405, selection probabilities of the operation i is calculated by Equation (1), P(i) is subjected to sorting, and then n operation IDs$_i$ are extracted in descending order of P(i).

$$P(i) = \sum_u Sim(u) \times p_u(i) \tag{1}$$

At Step S1406, the operation candidate table 302d is searched for the operations corresponding to the obtained operation IDs as many as the number of candidates n. At Step S1407, the obtained operation candidates and their selection probabilities corresponding to the operations are returned to the client machines 106a via the network, thereby ending the procedure at Step S1408.

With the process, the operation candidates including the similar operations performed by those other than the user requesting the operation candidates can be obtained.

Figure 15:
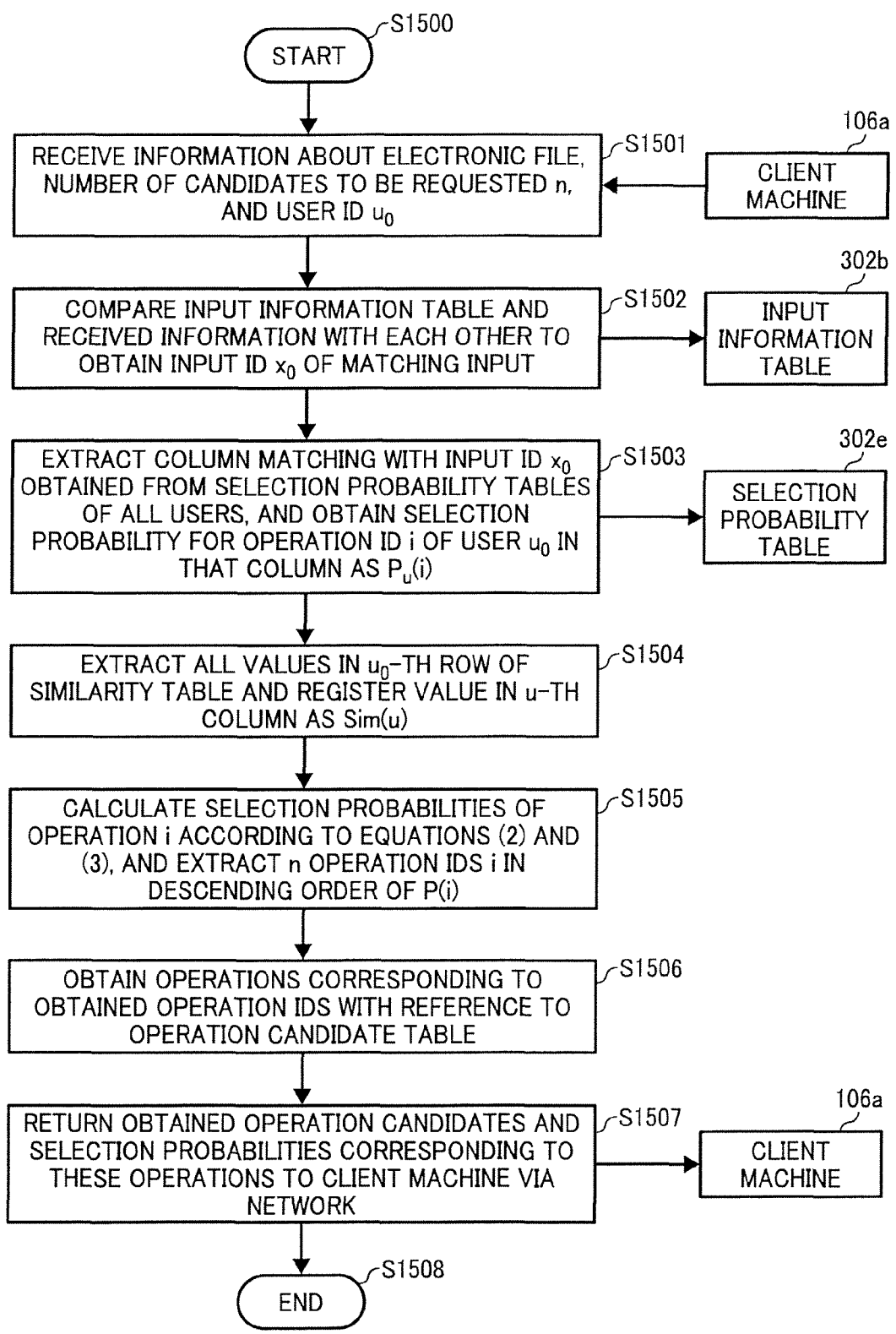
FIG. 15 is a flowchart of a second embodiment of a selection probability calculation performed by the function-selection-probability calculating unit of the management server.

FIG. 15 is a flowchart of a second embodiment of a selection probability calculation performed by the function-selection-probability calculating unit 300a of the management server 104. In the second embodiment shown in FIG. 15, the selection probabilities of the operations explained at Step S1405 shown in FIG. 14 are calculated by using Equations (2) and (3) below, where Equation (2) is applied when a versatility index α≠1 and Equation (3) is applied when a versatility index α=1. With other process steps being similar to those in FIG. 14, a calculation for the function candidates is performed.

$$p(i) = \left(\sum_u Sim(u) \cdot (p_u(i))^{\frac{1-\alpha}{2}}\right)^{\frac{2}{1-\alpha}} \quad (2)$$

$$p(i) = \exp\left(\sum_u Sim(u) \cdot \log(p_u(i))\right) \quad (3)$$

When selection probabilities are calculated by using Equations (2) and (3) above, by introducing the versatility index α (α is a real-number), the property of print settings to be presented can be adjusted. The versatility index α is a value indicating that the function is relatively easy to be selected by the user. In the embodiment explained with Equations (2) and (3), settings are such that α=0 is taken as a boundary, with a negative value increasing the selection probability and a positive value decreasing the selection probability. That is, when the versatility index α is smaller than 0, this means that the settings that will be commonly used by many users tend to be presented. By selecting an appropriate value of the versatility index α within this range, it is possible to stably predict settings that will be used by a user, based on an average tendency according to the statistics of similar users.

On the other hand, in the embodiment with FIG. 15 and Equations (2) and (3), when the versatility index α is larger than 0, settings that will not be used much but may be used with a high probability by part of similar users can be selected for designation. Such settings can promote efficient function selection, with the setting of the versatility index α being able to be registered for each user or user group so as to allow customization of function selection for each user or user group.

Here, the value of the versatility index α may be set by the management server 104 at a single value common to all user. Alternatively, in an adjustment screen provided by a utility function of the management server 104, or in the client machines 106a to 106d or the MFP 108, an adjustment screen is displayed, thereby allowing adjustment depending on whether a specific user often uses a general function or whether part of the users desires a customized specific function to be selected and presented. For this purpose, the management server 104, the client machines 106a to 106d, and the MFP 108 causes a customization screen, which will be explained further below, to be displayed on a display screen or an operation panel, thereby allowing priority of selection to be changed for each user or user group. Furthermore, when a function to be selected is customized, the type of the function is allocated within a specific value range of the versatility index α, and the function within ±β with respect to the designated versatility index α can be selected for display.

Figure 16:
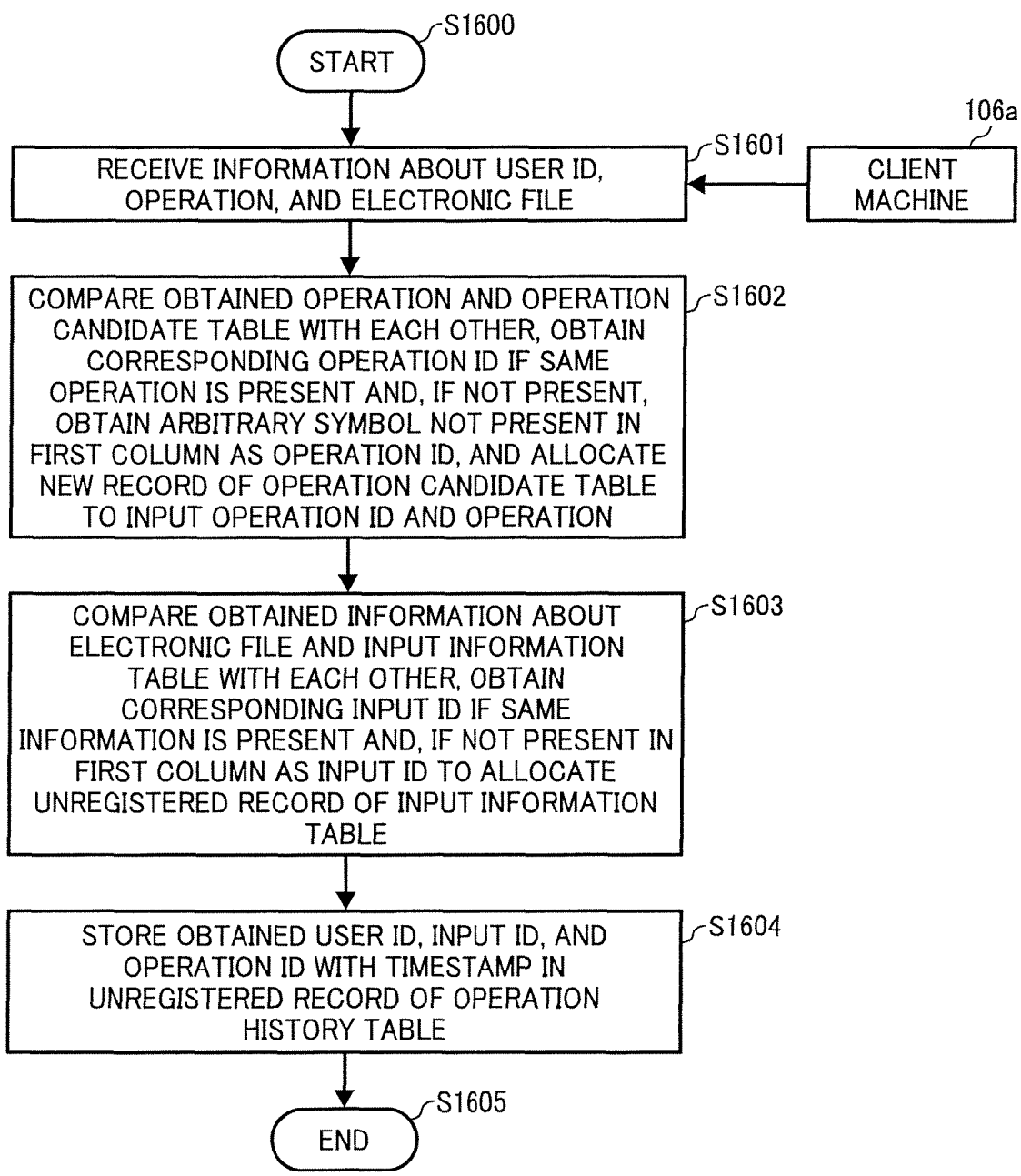
FIG. 16 is a flowchart of an embodiment of a process performed by a history updating unit.

FIG. 16 is a flowchart of an embodiment of a process performed by the history updating unit 300b. The process of the history updating unit 300b starts from Step S1600. At Step S1601, information about the user ID, the operation, and the electronic file are received from the client machine 106a. At Step S1602, the obtained operation and the operation candidate table are compared with each other, and if the same operation is present, the corresponding operation ID is obtained. Also, if the same operation is not present, the history updating unit 300b obtains an arbitrarily-set identification value, such as identification symbol, not present in the first column, an unregistered record of the operation candidate table 302d is allocated as a new record, and the operation ID and the operation are registered in that record.

At Step S1603, the obtained information about the electronic file and the input information table are compared with each other, and if the same information is present, the corresponding input ID is obtained. If not present, an arbitrary symbol not present in the first column is obtained as input ID to allocate unregistered record of the input information table.

At Step S1604, the obtained user ID, input ID, and operation ID with a timestamp are stored in the unregistered record with no element value being registered therein in the operation history table 302c, thereby ending the process at Step S1605. Here, a history update request from the client machine 106a can be issued to the management server 104 in response to an instruction of the user for updating the history, or a module of the operation-supporting-information processing unit 402 performed as a service process can automatically send the operation history to the management server 104 after the operation designated by the user ends.

The process of the probability updating unit 300c is explained below. Here, preferably, the process of the probability updating unit 300c is automatically performed at predetermined time intervals in the management server 104 by referring to a log of the operation history sent so far from each user. In another embodiment, the probability updating unit 300c is activated every time the process of the history updating unit 300b ends, thereby allowing a probability updating process.

More specifically, when performing an updating process by using logs accumulated at predetermined interval, the probability updating unit 300c repeatedly performs the same operation for each user ID as many times as the number of users N. Also, in the embodiment in which the probability updating unit 300c is activated every time the process of the history updating unit 300b ends, a probability updating process is performed only for the user ID obtained by the history updating unit. A specific process is performed according to the following sequence.

The probability updating unit 300c extracts, from the operation history table 302c, values of records about the user set as being a process target. The probability updating unit 300c then looks up the input information table 302b and the operation candidate table 302d to obtain, from among the element values of the extracted records, a set of the element value of the corresponding timestamp, the element value of the input information, and the element value of the operation information for rows (records) of the number of users N assumed to be within a process range, the set corresponding to the user ID to be processed. At this time, as element values forming a timestamp, date information and time information can be set in addition to year and month. By using the set of the element values obtained in a manner explained above, a Bayesian network technique is also used to allocate a directed acyclic graph to each element value and find a probability table with Bayes' theorem, conditional independency, and others being registered in advance for each element.

Then, a causal relation among the element values in the found Bayesian network is used, and when input information being registered in each record of the input information table 302b is observed, a probability that the operation details in each record of the operation candidate table 302d are simultaneously observed is found to update the selection probability of the selection probability table 302e. Here, for a calculation using a Bayesian network, Bayes Net Toolbox, which is an application package from Matlab™, can be implemented in the management server 104, a printer server, or the MFP 108, for example.

Figure 17:
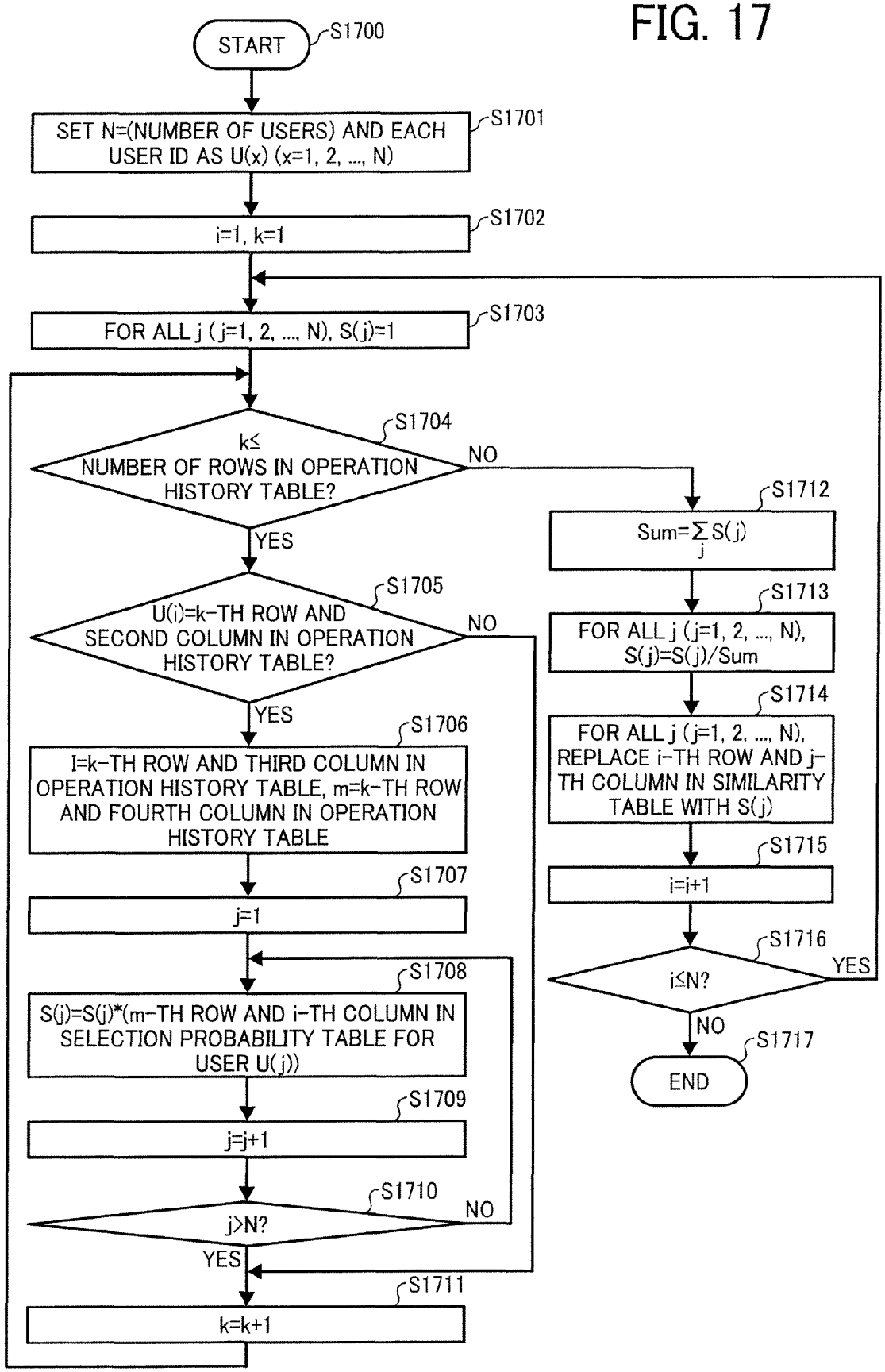
FIG. 17 is a flowchart of an embodiment of a process performed by a similarity updating unit.

FIG. 17 is a flowchart of an embodiment of a process performed by the similarity updating unit 300d. The process shown in FIG. 17 starts from Step S1700. At Step S1701, the number of all users is set as N, and the user ID of each user is set as U(x) (x=1, 2, 3, ..., N). At Step S1702, a counter i and a counter K are initialized. At Step S1703, for all j (j=1, 2, 3, ..., N), initialization is performed as S(j)=1.

While a condition of the counter k≦the number of records (rows) of the operation history table 302c is satisfied ("yes" at Step S1704), it is determined at Step S1705 whether U(i) is equal to the value in a k-th row and the second column in the operation history table 302c. Here, in the present embodiment, the second column in the operation history table 302c represents a field in which the user ID is registered. At Step S1704, if the counter k≦the number of records (rows) of the operation history table 302c is not satisfied ("no"), settings for all the number of records of the operation history have been completed, and therefore the procedure is branched to Step S1712. Also, if the value in the k-th row and the second column in the operation history table 302c is not equal to U(i) ("no") at Step S1705, in the present embodiment, this means an operation with an unmatched user ID. If such an operation is registered in the operation history, it is not appropriate to reflect this as a user's selection probability, and therefore the procedure is branched to Step S1711 to cause a process for another record to be performed.

On the other hand, if the value in the k-th row and the second column in the operation history table 302c is U(i) ("yes") at Step S1706, I is set as a k-th row and the third column in the operation history table 302c and m is set as the k-th row and the fourth column in the operation history table 302c. Here, in the present embodiment, the third column in the operation history table 302c represents a field in which the input ID is registered, whilst the fourth column therein represents a field in which the operation ID is registered. Then, at Step S1707, the counter j is initialized at 1 and, at Step S1708, S(j)=S(j)*(an m-th row and an I-th column in the selection probability table 302e allocated to U(j)) is calculated. Then, at Step S1709, the counter j is incremented. At Step S1710, it is determined whether the counter j exceeds the number of all users N. If the counter j does not exceed N ("no"), the procedure is branched to Step S1708, and the processes from Steps S1708 to S1710 are repeated until j>N is satisfied.

On the other hand, if j>N is satisfied at Step S1710 ("yes"), the procedure is branched to Step S1711, where the counter k is incremented to branch the procedure to Step S1704, and the calculation is repeated until all records in the operation history table 302c are processed.

After all records in the operation history table 302c are processed, at Step S1712, the calculated values of S(j) stored in the memory are summed. Then, at Step S1713, the values of S(j) are normalized for the counter j and, at Step S1714, the i-th row and the j-th column in the similarity table is replaced with normalized new S(j).

At Step S1715, the counter i is incremented. At Step S1716, if the counter i is equal to or smaller than the number of all users ("yes"), the procedure is returned to Step S1703 to repeat the calculation of S(j) again. On the other hand, if i>N at Step S1716 ("no"), the procedure ends at Step S1717. With this, the operation history table 302c can be updated in response to a history update request, thereby allowing operation support that reflects the history of all users. In this case, to the user requesting operation support, similar operations other than the operations performed by the user are also presented. However, the user cannot identify which user has performed similar operation. Therefore, operation support can be made without letting other users know the personal operation history of the user.

Figures 18, 19:
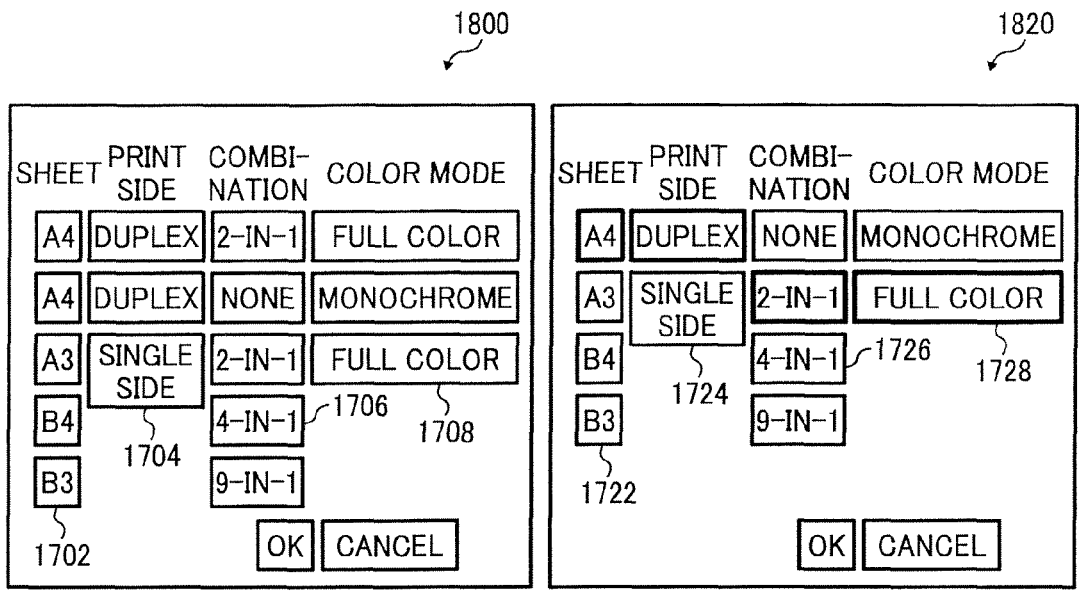

FIG. 18 depicts another embodiment in which a program for performing an operation supporting process is implemented as a printer driver of the client machine 106a. In the embodiment shown in FIG. 18, when the program is implemented as a printer driver, a printer server, the MFP 108, or the like connected via a network, such as a LAN, has implemented therein a function similar to that of the management server 104. In FIG. 18, it is assumed that the user issues a print instruction from a specific application or the like. At this time, on the display screen of the client machine 106, a print wizard 1800 is displayed. On the print wizard 1800, an icon 1802 for specifying a sheet size, an icon 1804 for specifying a print side, an icon 1806 for specifying a combining process, and an icon 1808 for specifying a color mode are displayed.

A print wizard 1820 represents a display state after all icons requested by the user to be set are clicked. As depicted in the print wizard 1820, the user performs at least four icon selecting and clicking operations, such as automatically selecting and clicking an icon 1722 for specifying a sheet size, an icon 1724 for specifying a print side, an icon 1726 for specifying a combining process, and an icon 1728 for specifying a color mode.

Then, when the user presses an "OK" button, the printer driver causes the operation history to be registered in a data table 1900 shown in FIG. 19. Here, the data table 1900 shown in FIG. 19 includes a field 1902 in which the operation ID is registered and a field 1904 in which the operation details are registered, and is configured in a manner similar to that of the operation candidate table 302d managed by the management server 104.

FIG. 20 is a drawing of an embodiment when an information processing apparatus 2000 of the present embodiment applies operation support to an electronic file stored in a medium registered in a drive such as a DVD drive, a CD-ROM drive, or a magneto-optical (MO) drive. Here, although the information processing apparatus 200 shown in FIG. 20 is configured as a personal computer, the information processing apparatus 2000 can have connected thereto an external medium, and can be a network-connected television set capable of receiving digital terrestrial broadcasting and digital satellite broadcasting. When the user inserts a recording medium into a drive of the information processing apparatus 2000, the information processing apparatus 2000 obtains attribute values of an electronic file registered in that medium, and sends an operation support request to the management server 104 via the network 228. The management server 104 processes the attributes of the electronic file included in the operation support request received from the information processing apparatus 2000, sends an operation support screen 2002 to the information processing apparatus 2000 and, as depicted in FIG. 20, causes the operation support screen 2002 to be displayed on the display screen.

FIG. 20 is details of the operation support screen 2002 are depicted. As depicted in FIG. 20, on the operation support screen 2002, a field 2004 in which a file name of an electronic file registered in the medium is displayed and a field 2006 in which a list of function operations is displayed are formed. For example, when the user uses a mouse or remote controller to select a photo album C, operations are displayed in the field 2006 for displaying a list of function operations, such as "display list", "delete", "slide show", and "mail". In the field 2006 shown in FIG. 20, when the user selects slide show 2010, an operation corresponding to that selection is performed, thereby allowing the user to perform a desired operation with a minimum operation instruction. Here, user's function selection is sent to the management server 104 as data for updating the operation history table 302c and others.

FIG. 21 is an embodiment of an adjust screen 2100 for selection probability caused to be displayed by the management server 104 of the present embodiment on a display screen of each of the client machines 106a to 106d or an operation panel of the MFP 108. On the adjust screen 2100, an indication that this screen is to specify function customization is displayed as "customization of function to be displayed". Also, the adjust screen 2100 is provided with a graphics display 2102 indicative of a degree of customization. Furthermore, correspondingly to the graphics display 2102, an indication of the degree of customization is displayed as an indication "for customization-oriented users" 2104 and an indication "for ordinary users" 2106.

By referring to the adjust screen 2100 shown in FIG. 21, the user can set the type of functions to be presented by changing the selection probability. In the embodiment shown in FIG. 21, a plurality of selection buttons 2108 to 2110 are provided according to the degree of customization. Each of the selection buttons 2108 to 2110 is allocated with a specific value range of the versatility index. On the other hand, as for the function to be selected, for example, a versatility index $\alpha$ corresponding to the function that will be used by the user on a statistic base is allocated, and is registered in a ROM, for example. When the user selects the selection button 2108, functions to which a versatility index within a range of $(\alpha_0 - \beta_0) \leq \alpha_0 \leq (\alpha_0 + \beta_0)$ is allocated, with a versatility index $\alpha_0$ allocated to the selection button 2108 as a center, are displayed on the display screen, thereby allowing customization for each user or user group.

As has been explained above, in the present invention, it is possible to provide an information processing apparatus, an operation supporting system, and a program in which, as for an operation input or an operation instruction to the information processing apparatus, a causal relation between the operation commands issued from the user and operation conditions is analyzed to perform a similarity calculation, thereby allowing operations that may be desired by the user to be displayed in descending order in a probabilistic point of view.

Also, when operation support is performed by using the management server, operations onto the electronic file performed by those other than the user can be presented as operation candidates. Irrespective of the amount of operation history of the user, operations with a high possibility that the user performs at that moment are selected and presented in view of the property of the electronic file and in a probabilistic point of view, thereby allowing operation support. Here, in the present embodiments, the management server may not particularly be required. In place of the management server, an input support process can be provided as a function provided by the MFP.

Furthermore, the functions in the embodiments can be achieved by a device-executable program written in an object-oriented programming language, such as C++, Java™, Java™ Beans, Java™ Applet, Java™ Script, Perl, or Ruby, and can be distributed as being stored in a device-readable recording medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that predicts a user's operation on an electronic file, the information processing apparatus comprising:
    an information obtaining unit that obtains file information on the electronic file;
    an information storing unit that stores therein the file information;
    an operation-candidate storing unit that stores therein content information on contents of the operation;
    a selection-probability storing unit that stores therein a probability value of selecting the operation provided for each user;
    a similarity storing unit that stores therein a similarity value of the operation between different users; and
    a probability calculating unit that calculates a function-selection-probability value for selecting an operation candidate for the electronic file to be operated by the user, by using the file information, the content information, the probability value, and the similarity value.

2. The information processing apparatus according to claim 1, wherein the information storing unit further stores therein an identification value for specifying the electronic file in association with the file information.

3. The information processing apparatus according to claim 1, further comprising: an operation obtaining unit that obtains an operation performed by the user on the electronic file; an operation-history storing unit that stores therein the operation obtained by the operation obtaining unit as an operation history; and a history updating unit that stores the operation obtained by the operation obtaining unit and the content information in the operation-history storing unit as the operation history.

4. The information processing apparatus according to claim 3, further comprising a probability updating unit that calculates a probability value of making an instruction for performing an operation on the electronic file by the user by using the operation history and the file information, and updates the probability value stored in the selection-probability storing unit with a calculated probability value.

5. The information processing apparatus according to claim 3, further comprising a similarity updating unit that calculates a similarity value of the operation between the different users by using the operation history and the probability value for each user, and updates the similarity value stored in the similarity storing unit with a calculated similarity value.

6. The information processing apparatus according to claim 1, wherein the probability calculating unit includes a selection-probability changing unit that changes an operation candidate to be selected by using a versatility index value for setting a selection probability to the operation candidate having a possibility of being selected by the user.

7. An operation supporting method of predicting a user's operation on an electronic file, the information processing method comprising:
   first obtaining including obtaining file information on the electronic file;
   first storing including storing the file information;
   second storing including storing content information on contents of the operation;
   third storing including storing a probability value of selecting the operation provided for each user;
   fourth storing including storing a similarity value of the operation between different users; and
   probability calculating including calculating a function-selection-probability value for selecting an operation candidate for the electronic file to be operated by the user, by using the file information, the content information, the probability value, and the similarity value.

8. The operation supporting method according to claim 7, further comprising the step of providing a storage device, and wherein the first storing further includes storing an identification value, in the storage device, for specifying the electronic file in association with the file information.

9. The operation supporting method according to claim 7, further comprising: second obtaining including obtaining an operation performed by the user on the electronic file; fifth storing including storing the operation obtained at the second obtaining as an operation history; and first updating including storing the operation obtained at the second obtaining and the content information at the fifth storing as the operation history.

10. The operation supporting method according to claim 9, further comprising second updating including calculating a probability value of making an instruction for performing an operation on the electronic file by the user by using the operation history and the file information, and updating the probability value stored at the third storing with a calculated probability value.

11. The operation supporting method according to claim 9, further comprising second updating including calculating a similarity value of the operation between the different users by using the operation history and the probability value for each user, and updating the similarity value stored at the fourth storing with a calculated similarity value.

12. The operation supporting method according to claim 7, wherein the probability calculating includes changing an operation candidate to be selected by using a versatility index value for setting a selection probability to the operation candidate having a possibility of being selected by the user.

13. A computer program product comprising a non-transitory computer-usable medium having computer-readable program codes embodied in the medium for predicting a user's operation on an electronic file, the program codes when executed causing a computer to execute:
   first obtaining including obtaining file information on the electronic file;
   first storing including storing the file information;
   second storing including storing content information on contents of the operation;
   third storing including storing a probability value of selecting the operation provided for each user;
   fourth storing including storing a similarity value of the operation between different users; and
   probability calculating including calculating a function-selection-probability value for selecting an operation candidate for the electronic file to be operated by the user, by using the file information, the content information, the probability value, and the similarity value.

14. The computer program product according to claim 13, wherein the first storing further includes storing an identification value for specifying the electronic file in association with the file information.

15. The computer program product according to claim 13, wherein the program codes further cause the computer to execute: second obtaining including obtaining an operation performed by the user on the electronic file; fifth storing including storing the operation obtained at the second obtaining as an operation history; and first updating including storing the operation obtained at the second obtaining and the content information at the fifth storing as the operation history.

16. The computer program product according to claim 15, wherein the program codes further cause the computer to execute second updating including calculating a probability value of making an instruction for performing an operation on the electronic file by the user by using the operation history and the file information, and updating the probability value stored at the third storing with a calculated probability value.

17. The computer program product according to claim 15, wherein the program codes further cause the computer to execute second updating including calculating a similarity value of the operation between the different users by using the operation history and the probability value for each user, and updating the similarity value stored at the fourth storing with a calculated similarity value.

18. The computer program product according to claim 13, wherein the probability calculating includes changing an operation candidate to be selected by using a versatility index value for setting a selection probability to the operation candidate having a possibility of being selected by the user.

* * * * *